United States Patent
Rosenberg et al.

(10) Patent No.: US 7,048,448 B2
(45) Date of Patent: May 23, 2006

(54) PRECISION FERRULE CONNECTOR ASSEMBLY

(75) Inventors: Paul Rosenberg, Sunnyvale, CA (US); Martin Wisecarver, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/694,119

(22) Filed: Oct. 27, 2003

(65) Prior Publication Data

US 2004/0247255 A1  Dec. 9, 2004

Related U.S. Application Data

(60) Provisional application No. 60/423,056, filed on Nov. 1, 2002.

(51) Int. Cl.
*G02B 6/36* (2006.01)
(52) U.S. Cl. .......................................... 385/60; 385/78
(58) Field of Classification Search .................. 385/60, 385/78, 55, 58, 77, 88, 92
See application file for complete search history.

(56) References Cited

U.S. PATENT DOCUMENTS

| 5,613,899 | A | * | 3/1997 | Weiss et al. ................. 451/245 |
| 5,971,626 | A | * | 10/1999 | Knodell et al. ................ 385/60 |
| 6,357,929 | B1 | | 3/2002 | Roehrs et al. |
| 6,485,189 | B1 | | 11/2002 | Gilliland et al. |
| 6,714,366 | B1 | | 3/2004 | Wisecarver et al. |
| 2004/0037509 | A1 | * | 2/2004 | Wisecarver .................. 385/55 |

\* cited by examiner

*Primary Examiner*—Sung Pak
*Assistant Examiner*—Mike Stahl
(74) *Attorney, Agent, or Firm*—Workman Nydegger

(57) ABSTRACT

A ferrule connector assembly includes a housing having a bore therethrough. The housing has a first end adapted to receive a sleeve assembly having a split sleeve and core member disposed in the split sleeve. A second end of the housing receives a ferrule containing an optical fiber. The core member has a hole extending therethrough that is optically aligned with the optical fiber. The sleeve assembly is press-fit within the bore of the housing and secured within the housing through one or more securing structures.

27 Claims, 3 Drawing Sheets

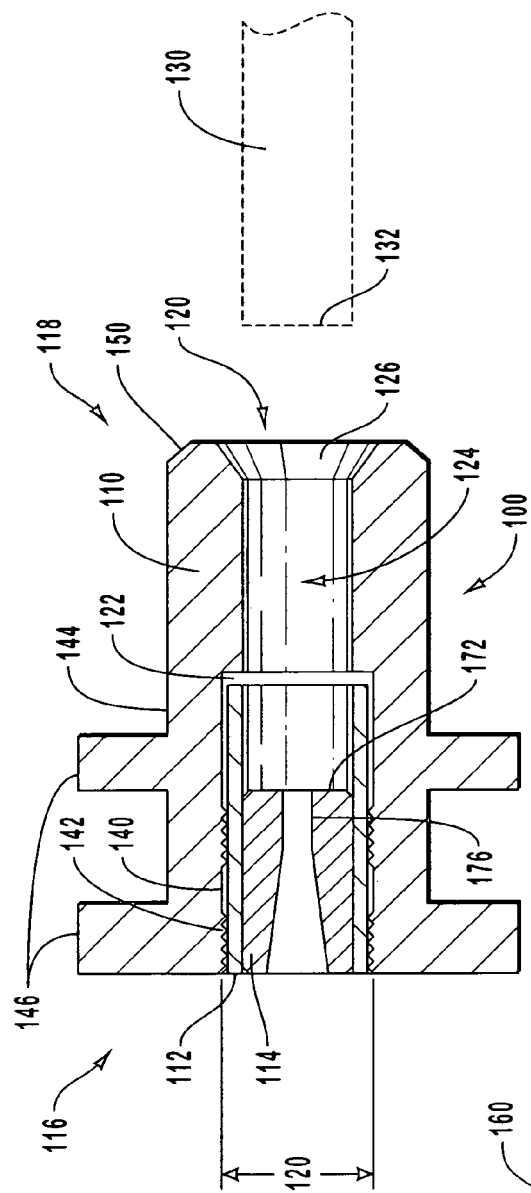
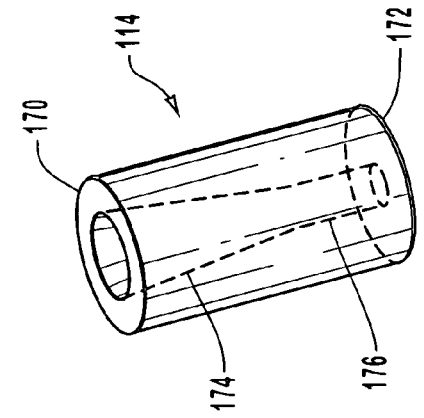
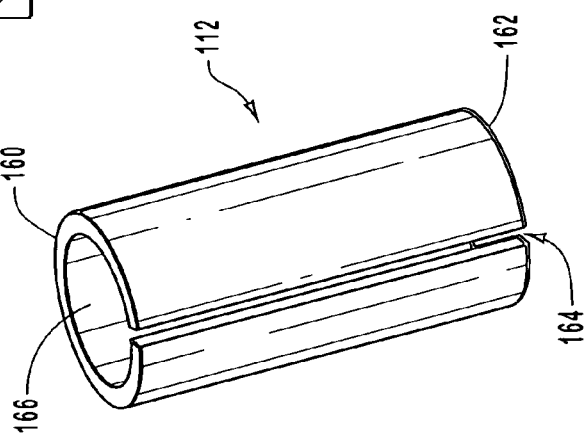

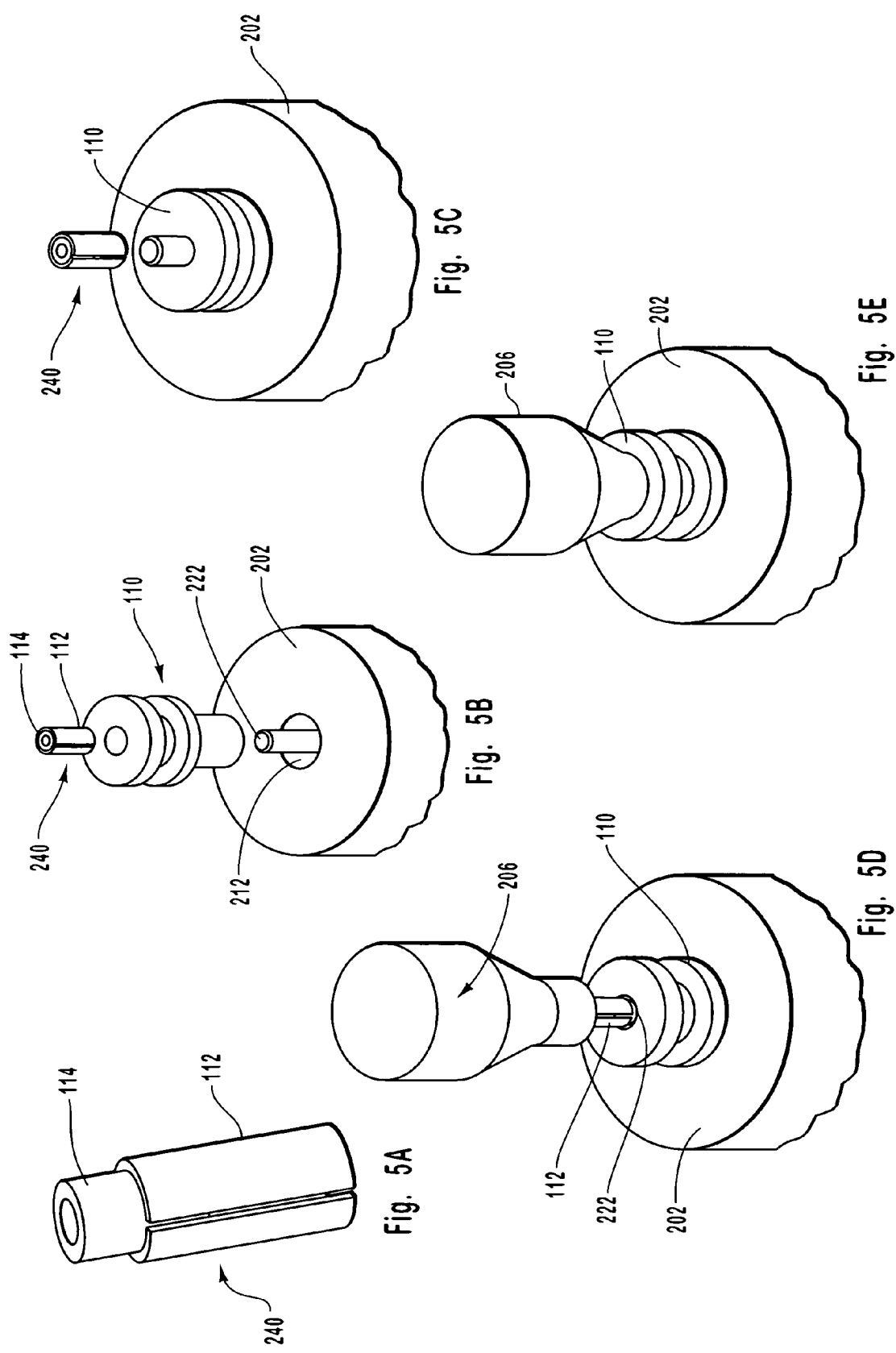

PRECISION FERRULE CONNECTOR ASSEMBLY

CROSS-REFERENCE TO RELATED APPLICATIONS

This application claims priority to and the benefit of U.S. Provisional Patent Application No. 60/423,056 filed on Nov. 1, 2002, and entitled "Precision Ferrule Connector Assembly" which is hereby incorporated herein by reference in its entirety.

BACKGROUND OF THE INVENTION

1. The Field of the Invention

The present invention relates to optical connectors, and more particularly to a ferrule connector assembly which is used to hold an optical fiber in precise alignment with respect to an optical transmitter or receiver.

2. The Relevant Technology

Ferrule type optical connectors are well known in the art, and include a receptacle for receiving an optical fiber ferrule. An optical fiber ferrule is a cylindrical member with a central bore through which an optical fiber extends. The ferrule provides a flat, cylindrical, or angle polished mating end surface and a cylindrical side surface, both of which engage corresponding mating surfaces of a ferrule receptacle or connector. The optical fiber terminates at or near the ferrule's flat mating surface.

The ferrule connector typically includes a cylindrical cavity for receiving and mating with the ferrule. The ferrule connector includes a hollow bore that is centered to the optical fiber, even after repeated re-connections, to maximize optical coupling efficiency. In order to ensure precise alignment, ferrule connectors typically include many piece parts and have to be optically aligned. The piece parts are assembled, aligned, and then generally secured with welds or adhesives to maximize the transmission of light signals through the connector.

Unfortunately, such connectors are cumbersome and expensive to manufacture. They generally require an active alignment process which is also both time consuming and expensive.

BRIEF SUMMARY OF THE INVENTION

The present invention is a ferrule connector assembly that overcomes the disadvantages outlined above. In one configuration, the ferrule connector assembly includes a housing having a bore therethrough. A first end of the housing and the bore receive a sleeve assembly formed from a split sleeve and a core member. The bore includes one or more securing structures that extend towards a central axis of the bore or generally extend away from an inner surface of the bore to engage with the sleeve assembly. The securing structures have sufficient resiliency to apply a force against the sleeve assembly to prevent removal of the sleeve assembly.

The split sleeve of the sleeve assembly has a channel extending from a distal end to a proximal end thereof. The channel enables the split sleeve to change inner and outer diameters under the influence of forces exerted upon the split sleeve. The channel expands as the core member is disposed within a lumen of the split sleeve, but the resiliency of the split sleeve applies a retaining force that prevent movement of the core member relative to the split sleeve. This retaining force is increased as the sleeve assembly is disposed within the bore of the housing.

The present invention also relates to a method for assembling a ferrule connector assembly. The method can include a step for inserting a core member having a hole therein into a split sleeve to form a sleeve assembly and a step for inserting, such as by press-fitting, the sleeve assembly into a housing, the housing having a first end adapted to receive a ferrule and a second end adapted to receive the sleeve assembly. This method can further include steps that are performed sequentially or contemporaneously. These steps can include a step for positioning the housing within a receptacle of a press guide assembly, a step for mounting the sleeve assembly on a press guide of the press guide assembly or at least partially within a bore of the housing, and a step for forcing or moving the sleeve assembly into the bore of the housing. Additional steps can include a step for applying a biasing force against moving the sleeve assembly into the bore of the housing, a step for preventing excessive movement of said sleeve assembly into said bore of said housing, and a step for moving said sleeve assembly into said bore of said housing until a distal end of said split sleeve is substantially flush with said first end of said housing.

The ferrule connector assembly of the present invention has many advantages over the prior art. First, it has only three parts. The split sleeve is a relatively inexpensive purchased part. The other two parts, the housing and the core member, are simple to make. Second, precise dimensional control is required only on the outer diameter of the core member, which then dictates the final inner diameter of the split sleeve in the assembled device. This precise dimension is formed through the simple process of center-less grinding.

The finished assembly is held together by a single press fit. There are no adhesives required in the assembly, which leads to a quicker, higher yielding assembly process. Due to the absence of adhesives, welds, or other secondary methods of fixing the assembly, the ferrule connector assembly of the present invention is also more robust and reliable in operation.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 is a side cross-sectional view of a ferrule connector assembly according to one exemplary embodiment of the present invention;

FIG. 2 is a perspective view of a split sleeve of the ferrule connector assembly of FIG. 1, according to one exemplary embodiment of the present invention;

FIG. 3 is a perspective view of a core member of the ferrule connector assembly of FIG. 1, according to one exemplary embodiment of the present invention;

FIGS. 5A to 5E are perspective views illustrating one method of fabricating and assembling a ferrule connector assembly according to another aspect of the present invention.

DETAILED DESCRIPTION OF THE EXEMPLARY EMBODIMENTS

Figure 4:
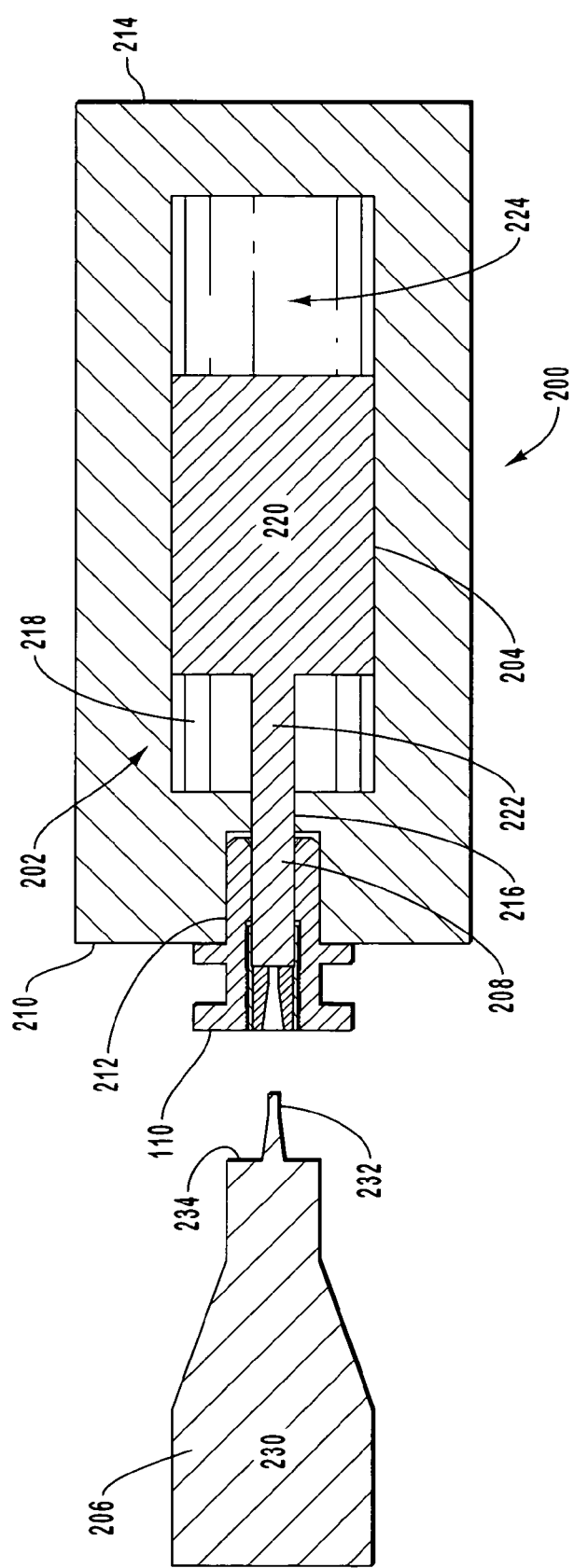
FIG. 4 is a side cross-sectional view of a press guide assembly and press tip used in the assembly of the ferrule connector assembly of FIG. 1.

The present invention is a precision ferrule connector assembly that holds an optical fiber in precise alignment with respect to an optical transmitter or receiver to which the connector assembly attaches. With reference to FIG. 1, a ferrule connector assembly 100 according to one aspect of the present invention is disclosed. Ferrule connector assembly 100 includes a housing 110, a split sleeve 112, and a core member 114.

Housing 110 has a generally elongated configuration with a first end 116 and a second end 118. Extending from first end 116 to second end 118 is a bore 120. The bore 120 has a stepped configuration that extends from a first portion 122 having a first diameter, to a second portion 124, having a second diameter, and finally to a tapered portion 126. The first portion 122 receives split sleeve 112 and core member 114, while second portion 124 and tapered portion 126 receive a ferrule 130, illustrated in dotted lines. The tapered portion 126 aids with insertion of ferrule 130 into second portion 124, such as a SC, ST, FC, LC, MU, MT, MTP, and other ferrules. Various configurations of tapered portion 126 are possible. Further, configurations of second end 118 need not include tapered portion 126.

As mentioned above, first portion 122 accommodates split sleeve 112 and core member 114. To aid with maintaining split sleeve 112 and core member 114 with first portion 122, an inner surface 140 of first portion 122 includes one or more securing structures 142. These securing structures 142 generally extend away from inner surface 140 and have sufficient resiliency to apply a force against split sleeve 112 and/or core member 114 that is sufficient to prevent removal of split sleeve 112 and/or core member 114 during use of connector assembly 100. In one configuration, these securing structures 142 include one or more teeth that deform, whether or not resiliently, as split sleeve 112 and/or core member 114 engage with inner surface 140. Use of securing structures 142 eliminates the need for welding or bonding of split sleeve 112 and/or core member 114 within first portion 122 of connector assembly 100. This reduces the time and expense with fabricating connector assembly 100.

Although reference is made to inner surface 140 including securing structures 142, securing structures 142 can be formed in a separate bushing element (not shown) that is slid within first portion 122 and fixably attached to inner surface 140. This bushing element would then receive split sleeve 112 and/or core member 114. In another configuration, securing structures 142 include a key and keyway structure, where a key formed in split sleeve 112 engages with a keyway of inner surface 140, or vise versa, to retain split sleeve 112 and/or core member 114 within first portion 122. In still another configuration, the tolerances of the inner diameter of first portion 122 and an outer diameter of split sleeve 112 are sufficient to result in a friction fit between the same upon first portion 122 receiving split sleeve 112. In another configuration, inner surface 140 includes one or more protrusions or serrations that engage split sleeve 112 and optionally deform or resiliently deform as they engage with split sleeve 112.

Extending from an outer surface 144 of housing 110 are attaching structures 146. These attaching structures 146 aid with affixing connector assembly 100 to other optical assemblies and subassemblies. Attaching structures 146 aid with affixing, whether temporarily or permanently, connector assembly 100 to a transmitter optical sub-assembly, receiver optical sub-assembly, or any other optical component that can use a ferrule-type connector. The attaching structures 146 can include fins, threads, or other structures known to those skilled in the art.

Disposed at second end 118 of housing 110 is a tapered section 150. This tapered section 150, in a similar manner to tapered portion 126, aid with attaching or connecting connector assembly 100 to other optical components. For instance, tapered section 150 assists with placing second end 118 within a recess of a complementary optical assembly or subassembly.

Generally, housing 110 can be a machined metal part having bore 120 therethrough. Illustrative metals can include, but not limited to, stainless steel, nickel plated brass or aluminum. Alternately, housing 110 can be a ceramic, plastic, or other material having sufficient strength to support the other components of assembly 100. Housing 110 can be machined on a screw machine or lathe or molded using appropriate equipment known to those skilled in the art. Since, as illustrated, housing 110 is radially symmetrical, it can be fabricated in a single step on a single machine, thus making it very easy to mass produce.

Split sleeve 112 cooperates with housing 110. As shown in FIG. 2, split sleeve 112 is a generally tubular member with a channel 164 extending from a proximal end 160 to a distal end 162. The channel 164 cooperates with a sleeve lumen 166 to enable an outer diameter and inner diameter of split sleeve 112 to change based upon the forces applied to the main body of split sleeve 112. For instance, forces applied against an outer surface of split sleeve 112 toward a central axis of split sleeve 112, cause a decrease in the size of channel 164, with a resultant decrease in the outer diameter of split sleeve 112 and a decrease in the diameter of sleeve lumen 166. Similarly, forces applied against an inner surface of split sleeve 112 away from a central axis of split sleeve 112, such as when core member 114 is disposed within sleeve lumen 166, increases the size of channel 164, with a resultant increase in the outer diameter of split sleeve 112 and the diameter of sleeve lumen 166.

The inner diameter of split sleeve 112, i.e., the diameter of sleeve lumen 166, can approximate inner diameter 118 of second portion 124, as shown in FIG. 1. By so doing, a portion of split sleeve 112 can receive a portion of ferrule 130 that passes through second portion 124 and into first portion 122 and split sleeve 112. With this configuration, split sleeve 112 further aids in securing ferrule 130 within connector assembly 100. In other configurations, the inner diameter of split sleeve 112 can be greater or lesser than inner diameter 118 of second portion 124.

Generally, split sleeve 112 can be fabricated from various materials, so long as the material allows split sleeve 112 to resiliently flex during application of a force that closes or opens channel 164 (FIG. 2). For instance, split sleeve 112 can be fabricated from metals, ceramics, plastics, polymers, synthetic materials, composites, or other suitable materials.

Core member 114 cooperates with split sleeve 112. Core member 114, as shown in FIG. 3, is a cylindrical component with a core first end 170, a core second end 172, and a hole 174 extending from core first end 170 toward core second end 172. As shown, hole 174 has a core tapered portion 174 that extends from core first end 170 towards core second end 172. This core tapered portion 174 and core first end 170 cooperate with another optical component or device, such as, but not limited to, a transmitter optical sub-assembly, receiver optical sub-assembly, and any other optical component that can use a ferrule type fiber optic connector.

Extending from an end of core tapered portion 174 is a core transition portion 176 that extends to core second end 172. This core transition portion 176 directs electromagnetic waves, such as light, either to or from the optical component or device mounted to connector assembly 100. With reference to FIG. 1, core second end 172 cooperates with a front face 132 (FIG. 1) of ferrule 130 to enable light to propagate along the optical fiber mounted within ferrule 130.

Although reference is made to core tapered portion 174 and core transition portion 176, one skilled in the art will understand that various other configurations of hole 174. For instance, core tapered portion 174 can extend from core first end 170 to core second end 172. In another configuration, core transition portion 176 extends from core first end 170 to core second end 172.

Core member 114 is fabricated with very precise dimensional control of its outer diameter. For instance, the outer diameter is approximately about 1 um or less. In other configuration, the outer diameter is greater than 1 um. In one configuration, the desired outer diameter of core member 114 is that which is generally larger than the inner diameter of split sleeve 116, such as larger than the diameter of sleeve lumen 166. For instance, core member 114 can have an outer diameter slightly larger than the inner diameter of split sleeve 112 prior to application of forces upon an outer surface of split sleeve 112, i.e., the "un-sprung state" of split sleeve 112. This is desired because the resiliency of split sleeve 112 applies a force upon core member 114 to retain core member 114 within sleeve lumen 166. Once the combination of split sleeve 116 and core member 114 are disposed within bore 120, securing structures 142 apply additional forces upon split sleeve 116 to reduce the dimensions of channel 164. The result is additional forces applied to core member 114; resulting in secure mounting of split sleeve 116 and core member 114 to connector assembly 100.

Fabrication of core member 114 can occur by a number of steps. Initially, hole 174 is formed through a cylindrical stock of material, where the material can be a metal, alloy, synthetic material, polymer, plastic, ceramic, composites, or combinations thereof. Forming hole 174 can be achieved through use of lasers, drills, or other structures known to those skilled in the art. Following hole formation, the stock material is sliced into pieces, i.e. parted off. Lasers, cutting blades, or other structures or devices can slice or part the stock material. Finally, a center-less grinding or other precision forming process, such as, but not limited to, molding or turning, reduces the outer diameter of the stock material to the desired precise dimension.

To facilitate assembly of ferrule connector assembly 100, a press guide assembly 200 can be used. With reference to FIG. 4, press guide assembly 200 includes a press base 202, a press guide 204, and a press tip 206. Press base 202 supports press guide 204 and housing 110 during fabrication and while press tip 206 forces split sleeve 112 and core member 114 within housing 110.

As shown in FIG. 4, press base 202 includes a base first end 210 having a receptacle 212. The housing 110 of ferrule connector assembly 100 at least partially mounts in receptacle 212 during fabrication. Extending from receptacle 212 toward a base second end 214 is a base channel 216. This base channel 216 receives a portion of press guide 204, while the remainder of press guide 204 slidably mounts within a base chamber 218 of press base 202. The configurations of base chamber 218 and base channel 216 can vary so long as they cooperate with the structures of press guide 204. In the exemplary configuration, base channel 216 and base chamber 218 are generally cylindrical, however, other cross-sectional configurations are possible, including, but not limited to, generally oval, polygonal, or other cross-sectional configurations.

Disposed within base chamber 218 is press guide 204. Press guide 204 includes a body 220 and a protrusion 222 extending from body 220. The protrusion 222 extends through base channel 216 to mount within a portion of bore 120 (FIG. 1) during fabrication. To limit movement of protrusion 222 and urge protrusion 222 through base channel 216, a biasing member 224 supports body 220 and restricts movement of press guide 204 within base chamber 218 as press tip 206 applies a force against housing 110, split sleeve 112, and core member 114. This biasing member 224 can be a spring, or other member(s) that applies a biasing force against at least a portion of press guide 204.

The press tip 206 is used to apply to mount split sleeve 112 and core member 114 with bore 120 of housing 110. Press tip 206 includes a tip body 230 having a tip protrusion 232 extending from a face 234 of tip body 230. The tip body 230 can be either grasped by an individual creating connector assembly 100 or mounted within a fabrication device. Whether tip body 230 is grasped by an individual or fabrication device, tip protrusion 232 mounts to at least a portion of split sleeve 112 and/or core member 114 during the fabrication process. In one configuration, tip protrusion 232 mounts within at least a portion of hole 174 of core member 114. In other configurations, tip protrusion 232 mounts within at least a portion of channel 164 of split sleeve 112. Generally, the configuration of tip protrusion 232 varies so long as it has a complementary structure to that of a portion of split sleeve 112 and/or core member 114. In still another configuration, the press tip excludes tip protrusion 232, such that face 234 of the press tip is used to position split sleeve 112 and core member 114 within bore 120 of housing 110.

Various steps can be used to fabricate ferrule connector assembly 100. Illustrated in FIGS. 5A–5E is one exemplary configuration for fabricating ferrule connector assembly 100 using press base 202, press guide 204, and press tip 206. It will be understood by one skilled in the art that the following process can be performed either manually or automatically.

With reference to FIG. 5A, core member 114 is inserted into split sleeve 112, thereby forming a sleeve assembly 240. Due to the difference in size between an inner diameter of split sleeve 112 and the outer diameter of core member 114, core member 114 remains within sleeve lumen 166 of split sleeve 112. Following, or contemporaneous with, mounting of core member 114 to split sleeve 112, housing 110 is mounted with receptacle 212 of press base 202, as shown by FIGS. 5B and 5C.

Once receptacle 212 securely receives a portion of housing 110, sleeve assembly 240 is partially mounted to protrusion 222 of press guide 204, as shown in FIG. 5C. The protrusion 222 extends through housing 110 due to the biasing force of biasing member 224 (FIG. 4). The protrusion 222 supports sleeve assembly 240 and locates sleeve assembly 240 at a location for press tip 206 to engage, as shown in FIG. 5D Moving press tip 206 toward press base 202 with sufficient force to overcome the biasing force exerted by biasing member 224 (FIG. 4) forces sleeve assembly 240 into bore 120 of housing 110, as illustrated in FIG. 5E. The support structures 142 (FIG. 1) press against the outer diameter of split sleeve 112, which in turn presses against core member 114. As press tip 206 moves toward press base 202, face 234 (FIG. 4) of press tip 206 acts as a stop to prevent excessive lateral movement of sleeve assembly 240 within bore 120 of housing 110, resulting in an end of sleeve assembly 240 being substantially flush with first end 116 of housing 110. This process results in a ferrule connector assembly fabricated from a single press-fit fabrication process, rather than processes that involve welding, bonding, or other techniques.

One skilled in the art will appreciate that various other processes can be used to fabricated a connector assembly of the present invention. For instance, in another configuration, the sleeve assembly is partially disposed within the lumen of housing prior to mounting housing within the receptacle of the press base. In such a configuration, the press guide is optionally included in the press base. In another configuration, a flat or planar surface of the press tip cooperates with the sleeve assembly to force the sleeve assembly into the lumen of the housing.

The finished ferrule connector assembly 100 provides very precise control of the inner diameter of split sleeve 112 (via the outer diameter of core 114). Ferrule connector assembly 100 can be attached to other optical subassemblies containing transmitters, receivers, or other passive devices using the attaching structures. In operation, ferrule connector assembly 100 is able to establish and very precisely maintain the alignment between an optical fiber within a ferrule and an optical sub-assembly, such as a transmitter optical sub-assembly or receiver optical sub-assembly.

The ferrule connector assembly 100 of the present invention has many advantages. First, it is comprised of only three parts that are relative inexpensive and simple to manufacture. Second, precise dimensional control is required only on the outer diameter of core member 114, which then dictates the final inner diameter of split sleeve 112 in the assembled device. This precise dimension is formed through the simple process of center-less grinding.

Third, the finished assembly is held together by a single press fit. There are no adhesives required in the assembly, which leads to a quicker, higher yielding assembly process. Fourth, due to the absence of adhesives, welds, or other secondary methods of fixing the assembly, the ferrule connector assembly of the present invention is more robust and reliable in operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ferrule connector assembly comprising:
    a housing having a first end, a second end, and a bore extending from said first end to said second end, said first end being adapted to receive a ferrule containing an optical fiber;
    a split sleeve at least partially disposed within said bore at said second end and secured within said housing through a press fit engagement between an outer surface of said split sleeve and at least a portion of said bore; and
    a core member at least partially disposed within said split sleeve, said core member having a hole optically aligned with the optical fiber.

2. The ferrule connector assembly of claim 1, wherein said housing further comprises at least one support structure, said at least one support structure being adapted to hold said split sleeve in optical alignment with said optical fiber of said ferrule.

3. The ferrule connector assembly of claim 1 wherein said housing further comprises an attachment structure disposed at said first end.

4. The ferrule connector assembly of claim 1, wherein said housing is radially symmetrical.

5. The ferrule connector assembly of claim 1, wherein said core member is formed to a dimension to ensure alignment of said hole with said optical fiber.

6. The ferrule connector assembly of claim 1, wherein said core member is formed to a dimension using a centerless grinding process.

7. A ferrule connector assembly comprising:
    a split sleeve adapted to receive a core member, said core member having a longitudinal hole therethrough; and
    a housing having a bore therethrough, said bore directly engaging an outer surface of said split sleeve, said housing having a first end adapted to receive said split sleeve and said core member and a second end adapted to receive a ferrule;
    wherein said core member is inserted into said split sleeve and said split sleeve is then inserted into said first end of said housing, said split sleeve being held in place by a friction force.

8. The ferrule connector assembly of claim 7, wherein said housing further comprises at least one securing structure cooperating with said bore, said at least one securing structure extending towards a central axis of said bore to engage with said split sleeve.

9. The ferrule connector assembly of claim 7, wherein said housing further comprises at least one securing structure that extends generally away from an inner surface of said bore.

10. The ferrule connector assembly of claim 9, wherein said at least one securing structure has sufficient resiliency to apply a force against said split sleeve to prevent removal of split sleeve.

11. The ferrule connector assembly of claim 7, wherein said housing further includes at least one attaching structure that enables said housing to attach to an optical component.

12. The ferrule connector assembly of claim 7, wherein said split sleeve further comprises a distal end, a proximal end, and a channel extending from said distal end to said proximal end.

13. The ferrule connector assembly of claim 7, wherein said bore comprises a first portion and a second portions, said first portion having a diameter larger than said second portion.

14. The ferrule connector assembly of claim 13, wherein said bore further comprises a tapered portion cooperating with said second portion.

15. A method for assembling a ferrule connector assembly comprising:
    a step for inserting a core member having a hole therein into a split sleeve to form a sleeve assembly; and
    a step for inserting said sleeve assembly into a housing, said housing having a bore extending from a first end of the housing to a second end of the housing, said first end adapted to receive a ferrule and said second end adapted to receive said sleeve assembly such that the bore directly engages an outer surface of the split sleeve in a press fit engagement.

16. The method of claim 15, wherein said step for inserting said sleeve assembly into said housing further comprises:
   a step for positioning said housing within a receptacle of a press guide assembly,
   a step for mounting said sleeve assembly on a press guide of said press guide assembly; and
   a step for forcing said sleeve assembly into a bore of said housing.

17. The method of claim 16, wherein said step for forcing comprise:
   a step for disposing a portion of a guide tip in said hole; and
   a step for moving said sleeve assembly towards a second end of said housing.

18. The method of claim 17, further comprising a step for applying a biasing force against moving said sleeve assembly towards said second end.

19. The method of claim 16, where said step for forcing comprises:
   a step for disposing a portion of a guide tip upon a distal end of said split sleeve; and
   a step for moving said sleeve assembly towards a second end of said housing.

20. The method of claim 15, wherein said step for inserting said sleeve assembly into said housing further comprises:
   a step for positioning said housing within a receptacle of a press guide assembly,
   a step for mounting said sleeve assembly into a bore of said housing; and
   a step for moving said sleeve assembly into a bore of said housing.

21. The method of claim 20, further comprising a step for applying a biasing force against moving said sleeve assembly into said bore of said housing.

22. The method of claim 20, further comprising a step for preventing excessive movement of said sleeve assembly into said bore of said housing.

23. The method of claim 20, further comprising a step for moving said sleeve assembly into said bore of said housing until a distal end of said split sleeve is substantially flush with said first end of said housing.

24. The method of claim 15, further comprising a step for forming said core member with a precise dimension.

25. The method of claim 24, further comprising a step for processing said core member using a center-less grinding process.

26. The method of claim 25, further comprising a step for processing said core member with a tolerance of less than one micrometer.

27. The method of claim 15, wherein the step for inserting said sleeve assembly into said housing comprises a step for press-fitting said sleeve assembly into said housing.

* * * * *

UNITED STATES PATENT AND TRADEMARK OFFICE
CERTIFICATE OF CORRECTION

| | | |
|---|---|---|
| PATENT NO. | : 7,048,448 B2 | Page 1 of 1 |
| APPLICATION NO. | : 10/694119 | |
| DATED | : May 23, 2006 | |
| INVENTOR(S) | : Rosenberg et al. | |

It is certified that error appears in the above-identified patent and that said Letters Patent is hereby corrected as shown below:

Column 1
Line 66, change "prevent" to --prevents--

Column 3
Line 38, change "with" to --within--

Column 4
Line 16, change "aid" to --aids--
Line 50, change "inner diameter 118" to --the inner diameter--
Line 58, change "inner diameter 118" to --the inner diameter--

Column 5
Line 19, after "174" insert --are possible--
Line 26, change "um" to --μm--
Line 27, change "um" to --μm--
Line 30, change "116" to --112--
Line 38, change "116" to --112--
Line 40, change "116" to --112--
Line 43, change "116" to --112--

Column 8
Line 53, change "portions" to --portion--

Column 9
Line 13, change "comprise" to --comprises--

Signed and Sealed this

Twenty-seventh Day of July, 2010

David J. Kappos
*Director of the United States Patent and Trademark Office*